United States Patent [19]

Withun et al.

[11] Patent Number: 5,782,448
[45] Date of Patent: Jul. 21, 1998

[54] APPARATUS FOR SUPPORTING A CONTAINER

[75] Inventors: Matthew C. Withun, Rochester Hills; Bradley A. Richards, Royal Oak; Thomas P. Muday, Auburn Hills, all of Mich.

[73] Assignee: LDM Technologies, Inc., Auburn Hills, Mich.

[21] Appl. No.: 677,084

[22] Filed: Jul. 9, 1996

[51] Int. Cl.$^6$ ........................................ A47K 1/08
[52] U.S. Cl. ............................ 248/311.2; 224/926
[58] Field of Search .................... 248/313, 311.2; 224/926

[56] References Cited

U.S. PATENT DOCUMENTS

| | | | |
|---|---|---|---|
| 4,511,072 | 4/1985 | Owens | 224/273 |
| 4,738,423 | 4/1988 | DiFilippo et al. | 248/311.2 |
| 4,792,184 | 12/1988 | Lindberg et al. | 297/194 |
| 5,060,899 | 10/1991 | Lorence et al. | 224/926 X |
| 5,259,579 | 11/1993 | Schneider | 248/311.2 |
| 5,297,767 | 3/1994 | Miller et al. | 248/311.2 |
| 5,603,477 | 2/1997 | Deutsch | 248/311.2 |

*Primary Examiner*—Ramon O. Ramirez
*Attorney, Agent, or Firm*—Harness, Dickey & Pierce, P.L.C.

[57] ABSTRACT

An apparatus for supporting a container includes a plurality of container engaging members or lobes attached to a frame. The container engaging members are pivotally mounted for rotation between fully extended positions and fully retracted positions and are biased into engagement with the container. The container engaging members each includes a camming surface configured to maintain line contact with a generally cylindrical container throughout a full range of motion. In the preferred embodiment, the camming surfaces have a variable radius of curvature. A biasing member preferably, but not exclusive, in the form of a continuous elastic band surrounds the frame and serves to bias each of the container engaging members.

16 Claims, 3 Drawing Sheets

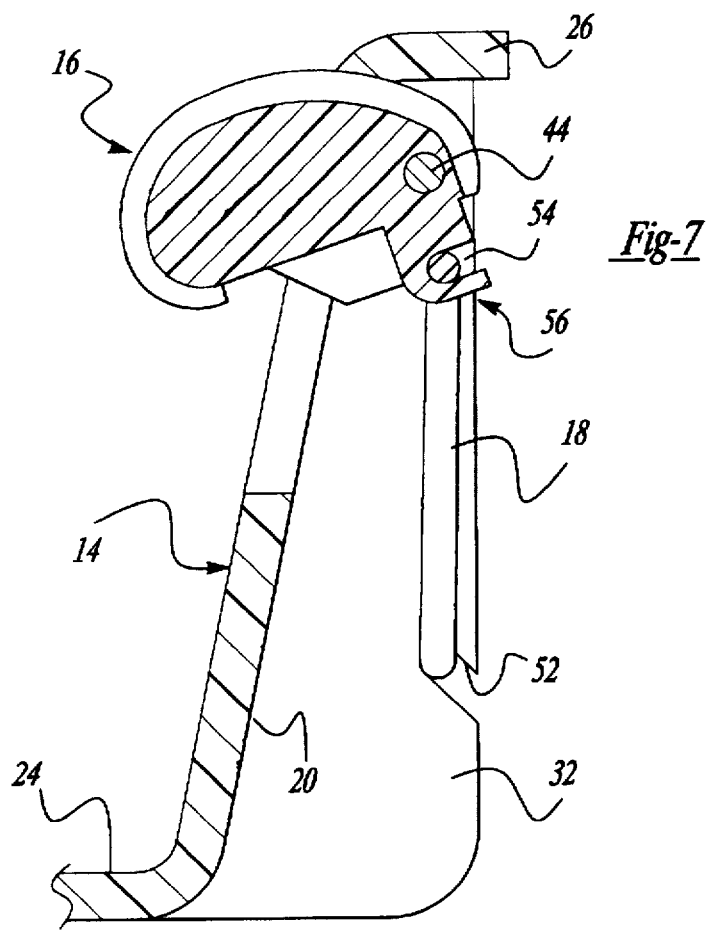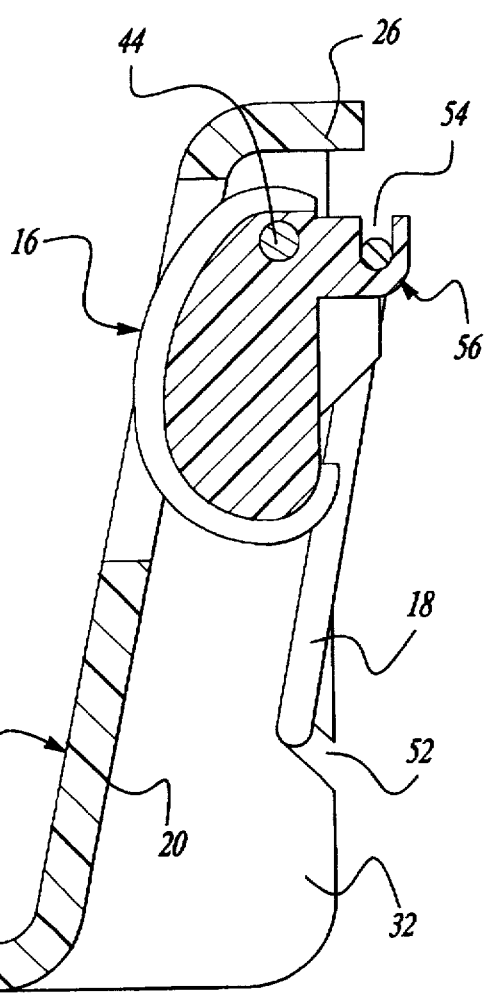

APPARATUS FOR SUPPORTING A CONTAINER

BACKGROUND

1. Field of the Invention

The present invention generally relates to an apparatus for supporting a container. More particularly, but not exclusively, the present invention relates to a container supporting apparatus for a vehicle which includes a plurality of biased lobes each configured for engaging a container with line contact.

2. Discussion

Beverage containers, including but not limited to coffee mugs, bottles, cans and paper cups, are available in a wide range of sizes and are often transported within the interior of vehicles for the convenience of the occupants. By the nature of their generally upright and cylindrical constructions, beverage containers are not sufficiently stable to functionally withstand the jostling encountered during normal motor vehicle travel unless physically held or otherwise appropriately secured. Because it is often desirable to set aside a beverage container during the course of a vehicular trip, the containers are often precariously placed on the floor or other surface where they are likely to be upset.

A number of devices for stabilizing containers within vehicles have been heretofore developed. Such devices range from simple static constructions intended to receive a single beverage container of average size to complex structures deployable from dashboards and armrests which adjustably receive multiple beverage containers. One example of such a device is shown and described in U.S. Pat. No. 4,792,184 to Lindberg, et al. In FIGS. 5-7, Lindberg et al. discloses a container holder having rigid segments pivotally attached to a frame and mounted adjacent an aperture for receiving a container. The rigid segments are intended to be displaced upon insertion of the container within the aperture and are mutually biased into engagement with the container by an elastic band. The elastic band is located within the aperture immediately below the rigid segments and must be radially displaced upon entry of the container.

SUMMARY OF THE INVENTION

In view of the foregoing above, it is a principal object of the present invention to provide an improved container supporting apparatus of simple construction which is capable of releasably and securely receiving containers of varying dimensions.

It is a related object of the present invention to provide a container supporting apparatus operable to engage the sidewalls of containers having various dimensions in line contact.

It is a further object of the present invention to provide a container supporting apparatus adapted to secure cylindrical containers of various diameters as well as standard sized, rectangular juice boxes.

In a first form, the apparatus of the present invention is operative for supporting a container and includes a frame at least partially defining an aperture for receiving the container. The apparatus further includes a plurality of substantially rigid container engaging members pivotally mounted to the frame. Each of the plurality of container engaging members includes a camming surface for establishing line contact with the container. The container engaging members are deflectable from a fully extended position towards a fully retracted position upon insertion of the container into the aperture. The apparatus further includes a biasing arrangement for biasing each of the plurality of container engaging members toward their fully extended positions and into contact with the container.

In another form, the apparatus of the present invention is operative for supporting a container and includes a frame which at least partially defines an aperture for receiving a container. The apparatus additionally includes a plurality of container engaging members each movable between a fully extended position and a fully retracted position. Further, the apparatus includes a continuous elastic member operatively engaged with each of the container engaging members for biasing the container engaging members to their fully extended positions. The continuous elastic member is disposed radially outward from the aperture and does thereby not interfere with entry of the container into the aperture.

In a more preferred form, the present invention is directed to an apparatus for supporting a container which includes a frame partially defining a generally cylindrical aperture for receiving the container. The apparatus additionally includes a plurality of substantially rigid container engaging members pivotally mounted to the frame. Each of the container engaging members include a camming surface for establishing line contact with the container and is deflectable from a fully extended position towards a fully retracted position in response to insertion of the container into the aperture. The apparatus further includes a continuous elastic member operatively engaged with each of the container engaging members for independently biasing the container engaging members to their fully extended positions. The continuous elastic member is disposed radially outward from the aperture for receiving the container. Preferably, the camming surface of each of the container engaging members is configured to maintain a line of contact on a common circle of variable diameter as the container engaging members are uniformly rotated through their range of motion.

The preferred embodiment of the present invention thus forms a uniquely simple yet effective arrangement for releasably and securely supporting a beverage container. The plurality of container engaging members of the preferred embodiment of the present invention enable a beverage container of any of a number of various sizes to be easily secured. Where the beverage container to be supported has a cylindrical cross section, each of the plurality of engaging members operates to establish line contact with the beverage container independent of the diameter of the beverage container. More specifically, displacement of the container engaging members from their fully extended positions to their fully retracted positions is caused by entry of the container into the aperture. As will become apparent, larger containers cause more displacement and thereby increase the radius of curvature of the contact line of the camming surface.

From the subsequent detailed description taken in conjunction with the drawings, other objects and advantages of the present invention will become apparent to those skilled in the art.

BRIEF DESCRIPTION OF THE DRAWINGS

FIG. 7 is a cross-sectional view taken through one of the container engaging members as the container engaging member is biased to its fully extended position; and FIG. 8 is a cross-sectional view similar to FIG. 7 illustrating the container engaging member rotated to its fully retracted position.

DETAILED DESCRIPTION OF THE PREFERRED EMBODIMENT

As required, a detailed embodiment of the present invention is disclosed herein. However, it is to be understood that the disclosed embodiment is merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
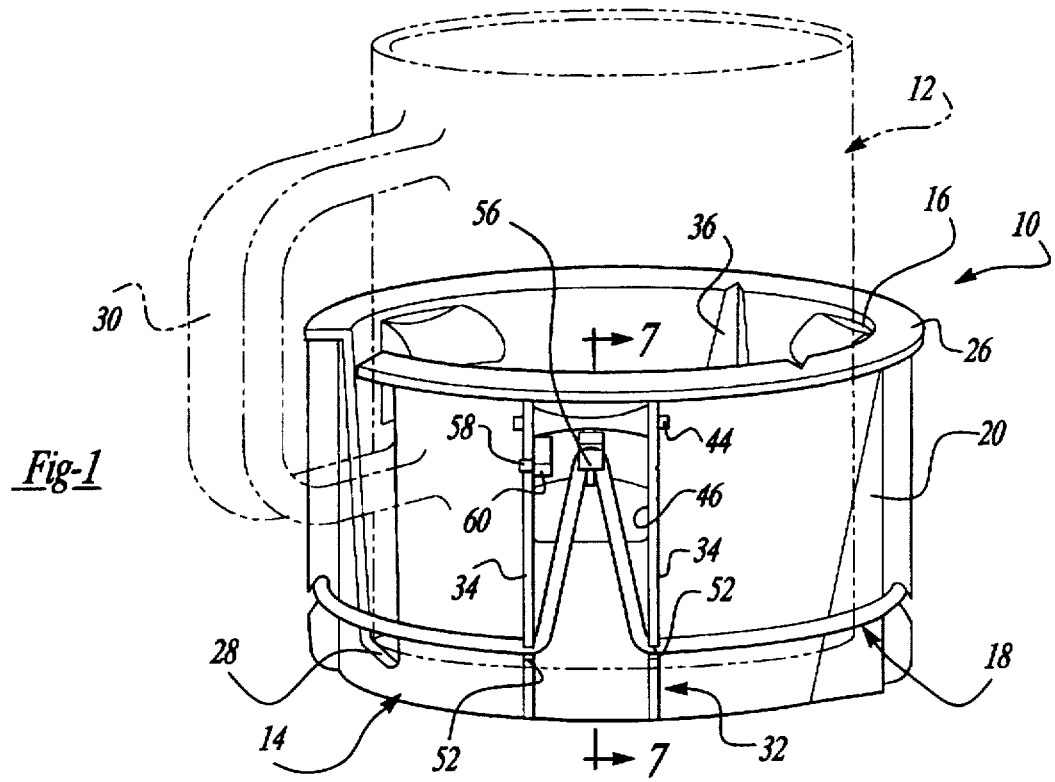
FIG. 1 is a perspective view of an apparatus for supporting a beverage container constructed in accordance with the teachings of the preferred embodiment of present invention shown in operative association with a coffee mug and operatively interconnected with a portion of a vehicle interior.
Figure 2:
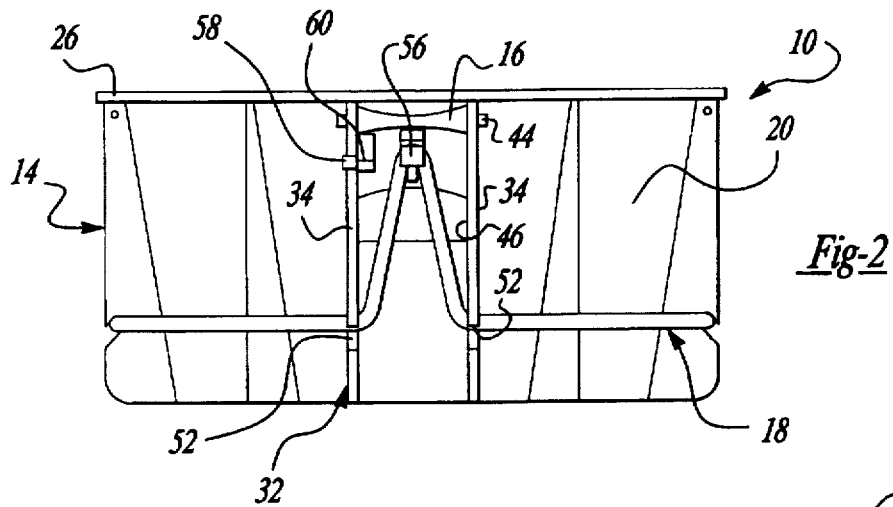
FIG. 2 is a side view of the apparatus for supporting a beverage container of FIG. 1.
Figure 3:
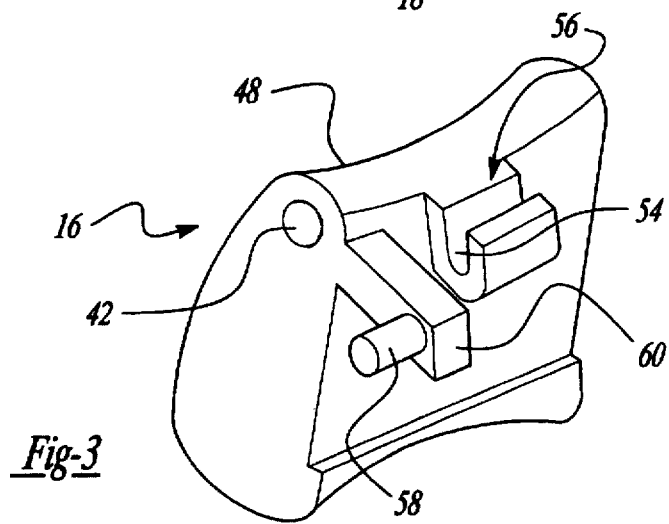
FIG. 3 if a rear perspective view of one of the container engaging members of FIG. 1 removed from the frame of the apparatus for purposes of illustration.

Referring now generally to the drawings and specifically to FIGS. 1 and 2 thereof, an exemplary apparatus constructed in accordance with the teachings of the preferred embodiment of the present invention is illustrated and identified with reference number 10. The apparatus 10 is specifically intended for supporting a container 12 and is shown in the perspective view of FIG. 1 in operative association with a coffee mug 12 (shown in broken lines). One intended application for the apparatus 10 is for installation into a preformed aperture in a motor vehicle interior console. However, it will be appreciated by those skilled in the art that the teachings of the present invention are widely applicable to additional applications where it is desirable to releasably secure a container.

The apparatus 10 is illustrated to generally include a frame 14, a plurality of container engaging members 16, and a biasing arrangement 18 for biasing the container engaging members 16 into contact with the container 12. The frame 14 is preferably integrally formed of injection molded plastic or other suitable material. The frame 14 includes an upwardly extending sidewall 20 which at least partially defines a generally cylindrical aperture 22 for receiving the container 12. The sidewall 20 tapers slightly as it extends downwardly. The frame 14 further includes a bottom surface 24 for directly supporting the container 12. A vertical slot 28 is formed in the sidewall 20 and extends substantially the entire length of the sidewall 20. In instances where the container 12 to be secured by the apparatus 10 is a coffee mug, the slot 28 functions to accept a handle 30 thereof.

The frame 14 is further integrally formed to include a plurality of mounting portions 32 equally spaced about its perimeter. As will become more apparent below, the mounting portions 32 facilitate pivotal attachment of the container engaging members 16 to the frame 14 and further assist in mounting of the biasing arrangement 18 to the frame 14. The mounting portions 32 each preferably includes a pair of spaced apart vertical flanges 34 which extend substantially along the entire length of the sidewall 20. The flanges 34 radially extend outward from the aperture 22. One pair of flanges 34 is associated with each of the container engaging members 16.

Figure 4:
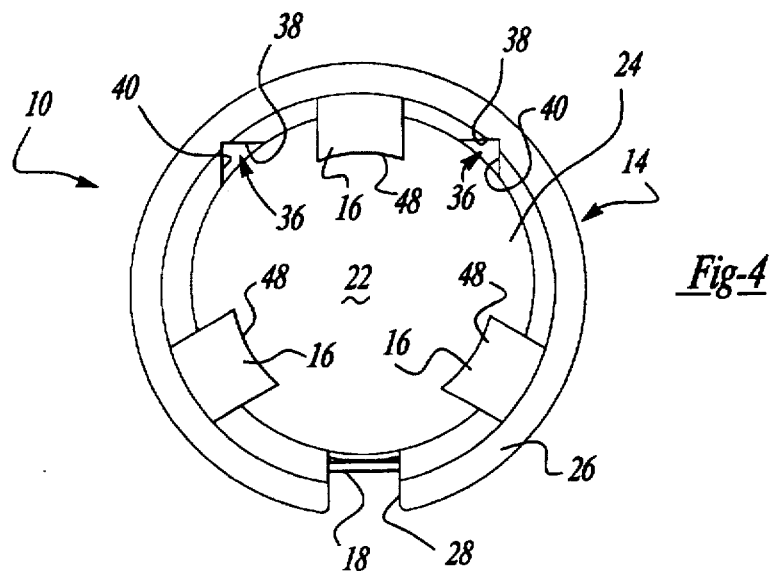
FIG. 4 is a top view of the apparatus for supporting a beverage container of FIG. 1, illustrating the plurality of container engaging members biased to their fully extended positions when not supporting a beverage container.
Figure 5:
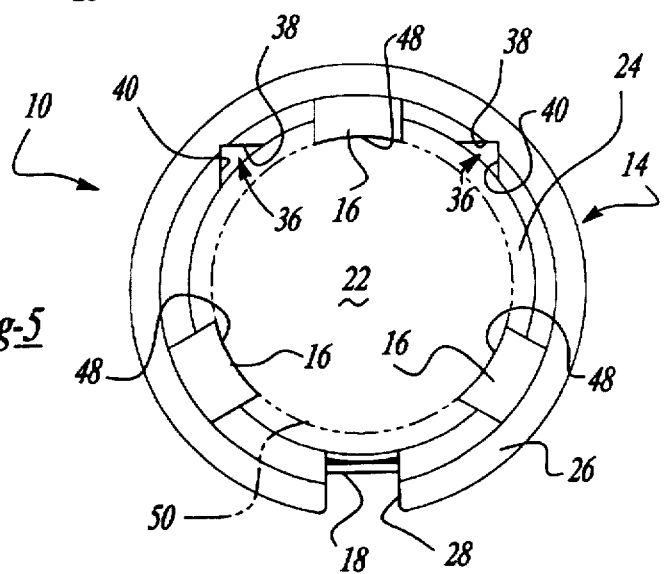
FIG. 5 is a top view similar to FIG. 4, illustrated for purposes of clarity removed from the portion of the vehicle interior and showing the plurality of container engaging members each in intermediate positions for supporting a generally cylindrical beverage container having a first diameter, the cylindrical beverage container represented by broken lines.
Figure 6:
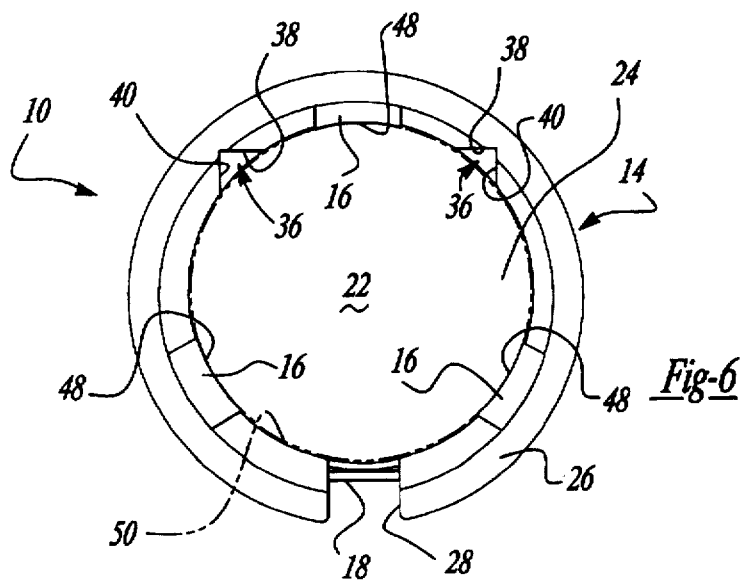
FIG. 6 is a top view similar to FIG. 5, illustrating the plurality of container engaging members each in their fully retracted positions for supporting a generally cylindrical beverage container having a second diameter, which is again represented by broken lines, the second diameter being substantially greater than the first diameter.

As shown most clearly in the top views of FIGS. 4 through 6, the continuity of the interior of the sidewall 20 is interrupted by two recesses 36 intended to receive adjacent corners of a standard-sized, rectangular beverage container (not shown), such as a juice box. The recesses 36 are shown to be generally triangular in top view and are defined by a pair of side surfaces 38 and 40 oriented generally normal to one another. The first sides 38 of the pair of sides 38 and 40 are in a common plane and are intended to abut one of the sides of the rectangular box. The second sides 40 of the pair of sides 38 and 40 are spaced apart from one another a distance generally corresponding with the width of a standard juice box and are intended to abut opposing sides of the box.

In the preferred embodiment, the plurality of container engaging members are substantially rigid lobes 16 constructed of plastic or other suitable material. The lobes 16 are three in number and are pivotally mounted to the frame 14. The container engaging members 16 are movable through a range of motion between a fully extended position (shown in FIG. 4) and a fully retracted position (FIG. 6).

In the exemplary embodiment illustrated, each of the container engaging members 16 is integrally formed to include a pair of mounting pin segments 42 which define an axis of rotation. The ends of the mounting pin segments 42 pass through apertures (not shown) located in an upper portion of the flanges 34 of each mounting portion 32. Alternatively, it will be appreciated that the container engaging members 16 can be formed to include a horizontal aperture extending therethrough adjacent an upper end adapted to receive a mounting pin defining the axis of rotation. A generally rectangular hole 46 is formed in the sidewall 20 of the frame 14 between each pair of flanges 34 for providing rotational clearance for the container engaging members 16.

Each container engaging member 16 is formed to include a camming surface 48 which has a concave curvature in a horizontal plane and a convex curvature in a vertical plane. The camming surfaces 48 of the container engaging members 16 are identically configured and are operative to maintain a line of contact on a common circle as the container engaging members 16 are uniformly rotated between their fully extended and fully retracted positions. More specifically, the camming surfaces 48 are configured such that when the container engaging members 16 are rotated through their range of motion, the innermost portions of the camming surfaces 48 which engage the container 12 cooperate to partially define a circle 50 (shown in FIGS. 5 and 6 in broken lines).

The biasing arrangement 18 is operative for biasing each of the container engaging members 16 toward its fully extended position. In the exemplary embodiment illustrated, the biasing arrangement 18 comprises a continuous loop or band of resilient or elastic material 18. In the preferred embodiment, the band 18 is constructed of a resilient elastomeric material, such as but not limited to ethylene propylene. However, it will be appreciated by those skilled in the art that any material of comparable strength, resiliency and wear resistance may be employed.

As illustrated, the elastic band 18 surrounds the exterior of the frame 14 and as a result is radially displaced from the aperture 22. Thus, the elastic band 18 does not interfere with entrance and egress of the container 12. The elastic band 18 is retained within upwardly angled slots 52 formed in both of the flanges 34 of the mounting portions 32 and is stretched upward to engage a recess 54 of a moment arm 56 which rearwardly extends from each of the container engaging members 16. A generally downward biasing force provided by the elastic band 18 functions to rotate the container engaging members 16 about their pivot axes to their fully extended positions. Friction between the elastic band 18 and the upwardly angled slots 52 of the flanges 34 functions to isolate the tension between the band 18 and the individual container engaging members 16. As a result, the container engaging members 16 are independently biased and centering of the container 12 within the aperture 22 is facilitated.

While the biasing arrangement 18 is shown and described as a continuous elastic band 18, it will be understood by those skilled in the art that various other arrangements may be employed for biasing the container engaging members 16 to their fully extended positions. For example, in one such alternative arrangement, individual coil springs (not shown) may be employed to independently bias the container engaging members 16. In another alternative arrangement, individual elastic bands (not shown) may be associated with each of the container engaging members 16.

In FIGS. 1, 2 and 4, the apparatus 10 of the present invention is shown operatively engaged with a portion of vehicle interior component 60. In the exemplary embodiment illustrated, the portion of the vehicle interior component is intended to represent a portion of a vehicle console 60. The apparatus 10 is attached to the vehicle console 60 in a generally conventional manner with a plurality of fasteners 62 extending from the vehicle console 60. The fasteners 62 engage apertures 64 formed in a corresponding plurality of mounting supports 66 which are integrally formed with the frame 14. It will be appreciated by those skilled in the art that the apparatus 10 can be alternatively attached to the vehicle interior component 60 in any of a number of other suitable manners well know in the art.

The operation of the present invention with a generally cylindrical container 12 will now be described. Prior to insertion of a container 12 into the aperture 22, the container engaging members 16 are normally biased to their fully extended positions as shown in FIG. 4. Upon initial insertion of the container 12, contact is established with the bottom of the container 12 and the container engaging members 16. The weight of the container 12 and perhaps slight manual urging operate to displace the container engaging members 16 toward their retracting positions against the biasing force of the elastic member 18.

The amount of rotation of the container engaging members 16 is dependent upon the particular diameter of the container 12. Due to the unique configuration of the camming surface 48 of container engaging members 16, uniform rotation of the container engaging members 16 operates to maintain line contact with a cylindrical container 12. In other words, as the container engaging members 16 are rotated to an intermediate position as shown in FIG. 5, the camming surfaces 48 of the container engaging members 16 lie on a common circle 50 and cooperate to establish line contact at spaced apart points with a container 12 having a first dimension. If the container 12 has an increased diameter, the container engaging members 16 are further rotated toward their fully retracted positions as shown in FIG. 6. Significantly, line contact still remains with the cylindrical container 12, since the varying curvature of the camming surfaces 48 of the container engaging members 16 is maintained on a common circle 50 (shown in FIG. 5). In their fully retracted positions, the container engaging members 16 are substantially flush with the sidewall 20 of the frame 14. Upon removal of the container 12 from the aperture 22, the container engaging members 16 immediately return to their fully extended positions.

When a standard-sized juice box (not shown) is inserted within the aperture 22, adjacent corners are received within the triangular recesses 36 defined by sides 38 and 40 to thereby stabilize the juice box. Further stabilization is provided by the container engaging members 16 which retract in a manner similar to that as discussed above. While line contact is not established between the container engaging members 16 and the juice box, the juice box is nevertheless sufficiently secured by virtue of the recesses 36.

In one application, the frame 14 defines a generally cylindrically aperture 22 having a maximum dimension adjacent an upper end of approximately 3½ inches. Due to the slight downward taper of the sidewall 20 in this particular application, the diameter adjacent to the lower end is approximately 3¼ inches. This particular application is adequate to releasably and securely support various cylindrical beverage containers having diameters ranging approximately from 2½ inches to approximately 3½ inches. Thus, the radius of curvature of the camming surfaces 48 of the container engaging members 16 varies from approximately 1¼ inches to 1¾ inches. It will be appreciated by those skilled in the art that the offered dimensions represent a single example which can be readily modified.

While it will be apparent to those skilled in the art, the preferred embodiment is well calculated to fulfill the above-stated objects, it will be also appreciated that the present invention is susceptible to modification, variation and alteration without departing from the scope and spirit of the claims as set forth below. For example, while the exemplary embodiment of the apparatus of the present invention is illustrated to include a stationary frame 14, it will be understood that the apparatus 10 can be modified for deployment from a dashboard, arm rest, or other interior vehicle structure.

What is claimed is:

1. An apparatus for supporting a container, the apparatus comprising:

a frame at least partially defining an aperture for receiving the container;

a plurality of substantially rigid container engaging members pivotally mounted to said frame, each of said plurality of container engaging members including a camming surface for establishing line contact with the container, each of said plurality of container engaging members being deflectable from a fully extended position towards a fully retracted position in response to insertion of the container in said frame, said camming members each being configured to maintain a line of contact on a common circle as said container engaging members are each uniformly rotated through their range of motion, said common circle having a variable diameter ranging from a first value when said container engaging members are in said fully extended positions to a second value when said container engaging members are in said retracted positions; and a biasing arrangement for biasing each of said plurality of container engaging members toward their fully extended positions and into contact with the container.

2. The apparatus for supporting a container of claim 1, wherein said biasing arrangement comprises a continuous elastic member in biasing engagement with each of said container engaging members.

3. The apparatus for supporting a container of claim 1, wherein said camming surfaces of each of said plurality of container engaging members are concavely curved in a horizontal plane.

4. The apparatus for supporting a container of claim 3, wherein said camming surfaces of each of said plurality of container engaging members has a variable radius of curvature ranging from approximately 1.25 inches to approximately 1.75 inches.

5. The apparatus for supporting a container of claim 3, wherein said frame includes a plurality of mounting portions corresponding in number to said plurality of container engaging members, said plurality of container engaging members each being pivotally attached to an associated one of said plurality of mounting portions.

6. The apparatus for supporting a container of claim 5, wherein each of said mounting portions comprises a pair of vertically disposed flanges extending outwardly from said aperture.

7. An apparatus for supporting a container, the apparatus comprising:

a frame at least partially defining a generally cylindrical aperture for receiving the container;

a plurality of container engaging members each movable between a fully extended position and a fully retracted position; and a continuous elastic member operatively engaged with each of said container engaging members for biasing said container engaging members to their fully extended positions, said continuous elastic member disposed radially outward from said generally cylindrical aperture for receiving the container;

said frame including a mounting portion associated with each of said plurality of container engaging members said mounting portions operative to engage said continuous elastic member and each including a pair of vertically disposed flanges outwardly extending from said aperture.

8. The apparatus for supporting a container of claim 7, wherein said container engaging members are pivotally attached to said frame.

9. The apparatus for supporting a container of claim 7, wherein said plurality of container engaging members are each pivotally attached to an associated one of said mounting portions.

10. The apparatus for supporting a container of claim 7, wherein each of said pair of vertically disposed flanges includes a slot for receiving said continuous elastic member.

11. The apparatus for supporting a container of claim 10, wherein said continuous elastic member independently biases each of said container engaging members.

12. An apparatus for supporting a container, the apparatus comprising:

a frame at least partially defining a generally cylindrical aperture for receiving the container;

a plurality of substantially rigid container engaging members pivotally mounted to said frame, each of said plurality of container engaging members including a camming surface for establishing line contact with the container, each of said plurality of container engaging members being deflectable from a fully extended position towards a fully retracted position in response to insertion of the container into said frame, said camming members each being configured to maintain a line of contact on a common circle as said container engaging members are each uniformly rotated through their range of motion, said common circle having a variable diameter ranging from a first value when said container engaging members are in said fully extended positions to a second value when said container engaging members are in said retracted positions; and a continuous elastic member operatively engaged with each of said container engaging members for biasing said container engaging members to their fully extended positions, said continuous elastic member disposed radially outward from said generally cylindrical aperture for receiving the container.

13. The apparatus for supporting a container of claim 12, wherein said camming surfaces of each of said plurality of container engaging members are concavely curved in a horizontal plane.

14. The apparatus for supporting a container of claim 12, wherein said plurality of container engaging members comprises three container engaging members.

15. The apparatus for supporting a container of claim 14, wherein said camming surfaces of each of said plurality of container engaging members has a variable radius of curvature ranging from approximately 1.25 inches to approximately 1.75 inches.

16. The apparatus for supporting a container of claim 15, wherein said frame further comprises a mounting portion associated with each of said plurality of container engaging members, said mounting portions operative to engage said continuous elastic member such that each of said plurality of container engaging members is independently biased towards its fully extended position.

* * * * *